(12) United States Patent
Asano et al.

(10) Patent No.: US 7,310,351 B2
(45) Date of Patent: Dec. 18, 2007

(54) METHOD AND APPARATUS FOR TRANSLATING PROTOCOL

(75) Inventors: Yutaro Asano, Yokohama (JP); Koji Tanaka, Yokohama (JP); Haruo Shibata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1006 days.

(21) Appl. No.: 10/236,316

(22) Filed: Sep. 5, 2002

(65) Prior Publication Data
US 2003/0185236 A1    Oct. 2, 2003

(51) Int. Cl.
*H04J 3/16*    (2006.01)
(52) U.S. Cl. .................. 370/466; 370/338; 370/349; 370/395.52; 709/245; 709/246; 709/230
(58) Field of Classification Search ................ 370/200, 370/466, 395
See application file for complete search history.

(56) References Cited

U.S. PATENT DOCUMENTS 6,708,219 B1 * 3/2004 Borella et al. .............. 709/245
6,832,251 B1 * 12/2004 Gelvin et al. ............... 709/224

FOREIGN PATENT DOCUMENTS

JP    2001-268129    9/2001

OTHER PUBLICATIONS

Internet Engineering Task Force, Request for Comments: 2766 "Network Address Translation-Protocol Translation (NAT-PT)" Feb. 2000.
Internet Engineering Task Force, Request for Comments: 2463 "Internet Control Message Protocol (ICMPv6) for the Internet Protocol Version 6 (lpv6) Specification" Dec. 1998.
Internet Engineering Task Force, Request for Comments: 792 "Internet Control Message Protocol DARPT Internet Program Protocol Specification" Sep. 1981.

* cited by examiner

*Primary Examiner*—Seema S. Rao
*Assistant Examiner*—Wanda Z Russell
(74) *Attorney, Agent, or Firm*—Townsend and Townsend and Crew LLP

(57) ABSTRACT

A translation apparatus retains a first correlation between a Mobile IPv6 terminal's home address and virtual IPv4 address. When the Mobile IPv6 terminal transmits a packet to said IPv6 network with a care-of address specified as the packet's source address and a home address specified in an extension header, the translation apparatus changes the packet's source address to a virtual IPv4 address that corresponds to the packet's home address in accordance with the first correlation, and then transmits the packet to an IPv4 network. Mobile IPv6 terminal-to-IPv4 terminal communication can then be established between an IPv6 network to which Mobile IPv6 terminals are connected and an IPv4 network to which IPv4 terminals are connected.

9 Claims, 15 Drawing Sheets

METHOD AND APPARATUS FOR TRANSLATING PROTOCOL

BACKGROUND OF THE INVENTION

The present invention relates to a protocol translation method and protocol translation apparatus, and more particularly to a protocol translation method and apparatus suitable for intercommunications between an IPv4 terminal existing in an IPv4 network and a Mobile IPv6 terminal existing in an IPv6 network.

In recent years, a serious problem has arisen due to widespread use of Internet Protocol (IP). That is, the number of IP addresses available is insufficient. It is anticipated that this IP address depletion problem will be exacerbated with accelerating speed because an increasing number of devices other than personal computers (PCs) will be connected to Internet. Under these circumstances, there is an increased necessity for switching to the next-generation IP standard named "IPv6 (Internet Protocol version 6)", which has a vast address space (128-bit long addresses) and offers improved security functions, priority control functions, automatic configuration functions, and various other enhanced functions.

When formulating a detailed plan for switching from IPv4, which is the current IP standard, to IPv6, however, it is necessary to replace routers and other devices and replace and/or add software for the purpose of making an existing IPv4 network compliant with IPv6. Such a changeover would entail enormous cost. Further, there is a risk of affecting operations when you replace running devices or add new functions. As such being the case, it is necessary to make a gradual transition to IPv6 without seriously affecting currently used IPv4 networks. It must be pointed in this connection that the technology for providing intercommunications between these two different networks is required over a transitional period during which IPv4 and IPv6 networks coexist.

To establish communication between devices having IPv4 communication functions only and devices having IPv6 communication functions only, it is necessary to provide translation between IPv4 packets and IPv6 packets at a certain point in an intermediate route. This translation is performed by an IPv4/IPv6 translation apparatus.

An IPv6 terminal has a 128-bit IPv6 address, whereas an IPv4 terminal has a 32-bit IPv4 address. These addresses are used for terminal identification. However, these two terminals differ in the addressing system and cannot identify the address of the other terminal. When IPv6 terminals and IPv4 terminals communicate with each other as shown in FIG. 1, therefore, the IPv4/IPv6 translation apparatus must assign tentative virtual IPv4 addresses to the IPv6 terminals and tentative virtual IPv6 addresses to the IPv4 terminals. When assigning the virtual addresses, the IPv4/IPv6 translation apparatus uses addresses it retains. Further, IPv4 addresses can be embedded in the 32 low-order bit positions of an IPv6 address. Therefore, an IPv6 address having an embedded IPv4 address can be used as a tentative virtual IPv6 address of an IPv4 terminal. The example shown in FIG. 1 indicates that a tentative virtual IPv4 address (192.168.0.1) is assigned to IPv6 terminal A by an address management table 60.

One publicly known example is the Internet Engineering Task Force's (IETF's) "Network Address Translation—Protocol Translation (NAT-PT)" (RFC (Request For Comment) 2766).

Meanwhile, PCs having mobile communication functions are now capable of connecting to a nearby network after a move to receive services in a so-called mobile computing environment. At present, Mobile IPv6 and other protocols are proposed as a standard procedure to be performed by nodes (PCs, PDAs, and other computer network terminals) for establishing communication.

In Mobile IPv6, each terminal has two IP addresses as shown in FIG. 2: home address and care-of address. The care-of address varies with the connected subnetwork when the terminal moves. The home address, on the other hand, remains unchanged not matter whether the terminal moves. A home agent uses its incorporated storage section to memorize an address management table, which defines the relationship between the home address and care-of address. The home agent receives a packet containing a new care-of address from a moved Mobile IPv6 terminal and updates the associated address management table data.

When there is an intention to establish communication with a Mobile IPv6 compliant terminal (hereinafter referred to as a Mobile IPv6 terminal) but its care-of address is not known, a packet is transmitted to the home address of that Mobile IPv6 terminal. In Mobile IPv6, the home agent receives the packet that is transmitted to the home address, and transfers the received packet to the care-of address of a Mobile IPv6 terminal that corresponds to the home address. Mobile IPv6 communication is established in this manner.

The technology concerning the above-mentioned Mobile IPv6 terminal communication is described in JP-A No. 268129/2001.

SUMMARY OF THE INVENTION

The present invention provides packet communication between Mobile IPv6 terminals and IPv4 terminals. As shown in the block diagram in FIG. 3, a transportable Mobile IPv6 terminal 10 and a home agent 20 are both connected to a Mobile IPv6 network (first network). Meanwhile, an IPv4 terminal 30 is connected to an IPv4 network (second network). The Mobile IPv6 network is connected to the IPv4 network via an IPv4/IPv6 translation apparatus 40.

FIG. 4 shows the format of a message header that is attached to data in an IPv6 packet. As indicated in FIG. 4, the header contains the information about the protocol version and the traffic class, which provides priority level recognition. The header also contains a source address, which is the address of a terminal that has transmitted a packet, a destination address, which is the address of a terminal that is to receive the packet, and an optional extension header. FIG. 5 indicates that the message header format of a Mobile IPv6 packet is the same as for an IPv6 packet shown in FIG. 4. However, the Mobile IPv6 packet differs from the IPv6 packet in that the extension header of the former contains a home address.

The block diagram shown in FIG. 6 illustrates a Mobile IPv6 terminal 10 that is turned ON and then moved. After the Mobile IPv6 terminal 10 is turned ON and started up, it notifies a home agent 20 of its home address and care-of address (S10→S20). The home agent 20 registers the notified home address 22 and care-of address 23 in the address management table 21 shown in FIG. 2 (S30). Further, the home agent 20 sends an acknowledgment packet back to the Mobile IPv6 terminal 10 (S40). If the Mobile IPv6 terminal 10 moves subsequently (S50), the home agent registers the invariable home address 22 and a new care-of address 23, which results from a move, in the address management table, and sends an acknowledgment packet back to the Mobile IPv6 terminal 10 (S70).

The next description relates to a packet communication process that is performed between an IPv4 terminal 30 and a Mobile IPv6 terminal 10, which notifies a home agent 20 of a home address 22 and care-of address 23.

FIG. 7 shows a packet transmission from a Mobile IPv6 terminal 10 to an IPv4 terminal 30. As indicated in FIG. 7, the Mobile IPv6 terminal 10 has the care-of address value 2100::1 and the home address value 2000::1. The IPv4 terminal 30 has the address value 10.0.0.1. The address management table of the IPv4/IPv6 translation apparatus stores the relationship between the IPv4 and IPv6 addresses. This translation table can be created either dynamically or statically, as stated in the IETF's RFC 2766.

Before the Mobile IPv6 terminal 10 moves, it sends a packet to an IPv6 network with its care-of address (2100::1) used as the source address for the packet to be transmitted and the home address value (2000::1) of the Mobile IPv6 terminal 10 stored as the IPv6 extension header for the packet (S110). The IPv4/IPv6 translation apparatus 40 receives the packet from the IPv6 network, translates the source address to the corresponding virtual IPv4 address (192.168.0.1) with the address management table, and sends the packet to the IPv4 network (S120). The IPv4 terminal 30 recognizes the source address value as 192.168.0.1. If the Mobile IPv6 terminal 10 moves to another network during the packet communication so that its care-of address value changes to 2200::1 (S130), the Mobile IPv6 terminal 10 sends a packet to the IPv4 terminal 30 with the new care-of address used as the source address (S140). The IPv4/IPv6 translation apparatus 40 performs translation while correlating the care-of address prevailing after the move to an address different from the IPv4 address correlated to the care-of address used before the move (S150). The IPv4 terminal 30 recognizes the source address value as 192.168.0.2.

As a result, the source address of the packet received by the IPv4 terminal 30 is changed after the move of the Mobile IPv6 terminal 10. As such being the case, continued packet communication cannot be maintained because the IPv4 terminal 30 cannot conclude that the received packets are transmitted from the same source. In other words, if the Mobile IPv6 terminal 10, which is the source of transmission, moves, the IPv4 terminal 30 cannot receive a packet carrying an address different from that used before the move of the Mobile IPv6 terminal 10. A packet loss occurs in this manner.

The object of the present invention is to remarkably reduce the interruption of packet communications between a Mobile IPv6 terminal and IPv4 terminal without regard to the move of the Mobile IPv6 terminal.

To solve the above problem, a protocol translation method of the present invention permits a translation apparatus to retain a first correlation between the home address and virtual IPv4 address of a Mobile IPv6 terminal in a network system where an IPv6 network to which the Mobile IPv6 terminal is connected is connected via the translation apparatus to an IPv4 network to which an IPv4 terminal is connected. When the Mobile IPv6 terminal transmits a packet to said IPv6 network with the care-of address specified as the source of packet transmission and the home address specified as the extension header, the translation apparatus translates the source address contained in the packet to the virtual IPv4 address that is associated with the packet's home address in accordance with the first correlation, and then transmits the packet to the IPv4 network.

If the Mobile IPv6 terminal moves, causing its care-of address to be changed, it transmits the packet to the IPv6 network with the new care-of address specified as the source of packet transmission and the same home address as prevailing before the move specified as the extension header.

The translation apparatus also retains a second correlation between the home address and care-of address the Mobile IPv6 terminal. When a Mobile IPv4 terminal sends a packet to the IPv4 network with a virtual IPv4 address specified as the packet destination, the translation apparatus translates the virtual IPv4 address of the packet destination into a corresponding home address in accordance with the first correlation, translates the home address into a corresponding care-of address in accordance with the second correlation, changes the destination to the translated care-of address, and sends the packet to the IPv6 network.

Other and further objects, features and advantages of the invention will appear more fully from the following description.

DETAILED DESCRIPTION OF THE INVENTION (1) First Exemplary Embodiment

Figure 1:
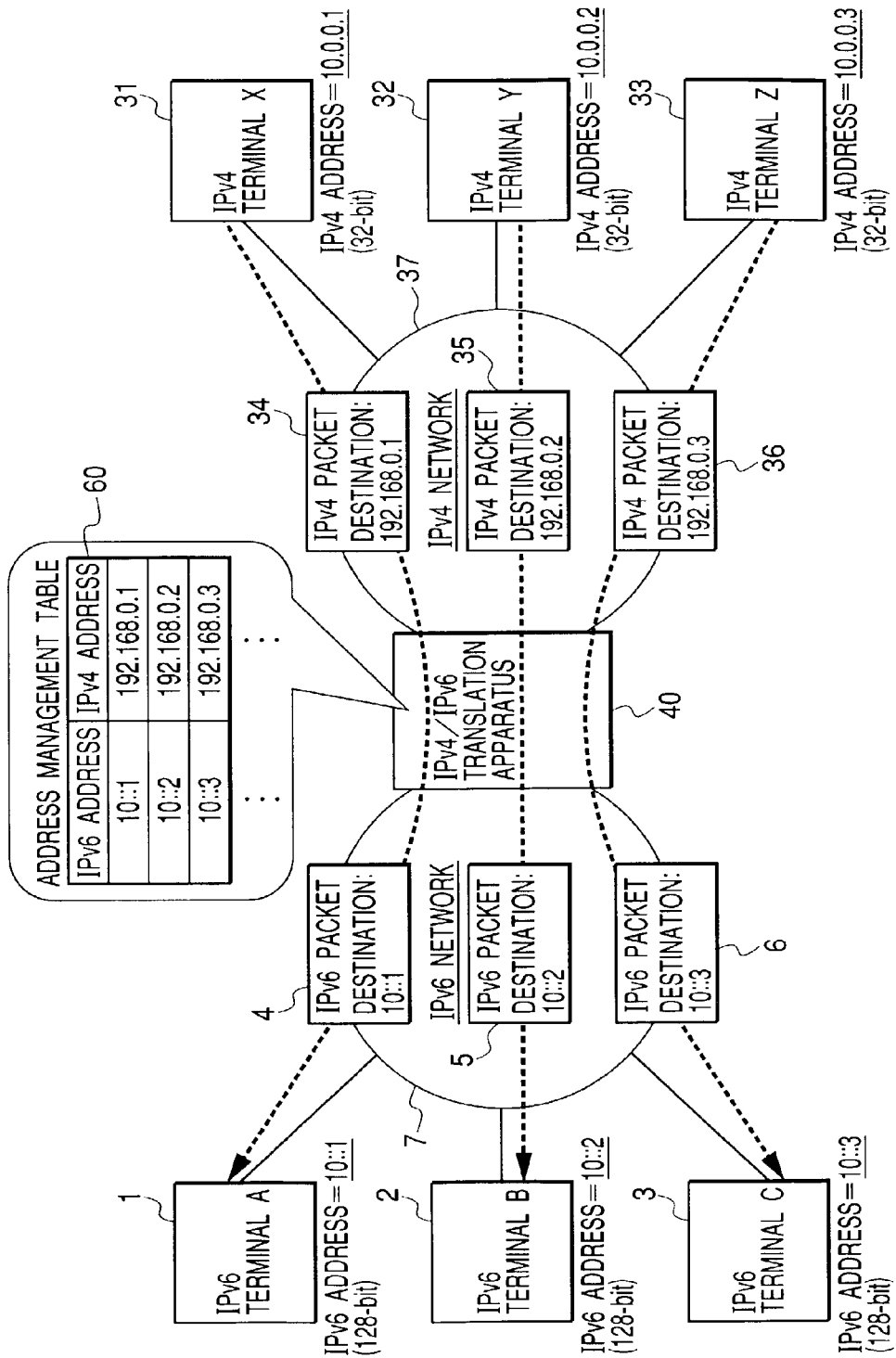
FIG. 1 illustrates the operation of an IPv4/IPv6 translator.
Figure 2:
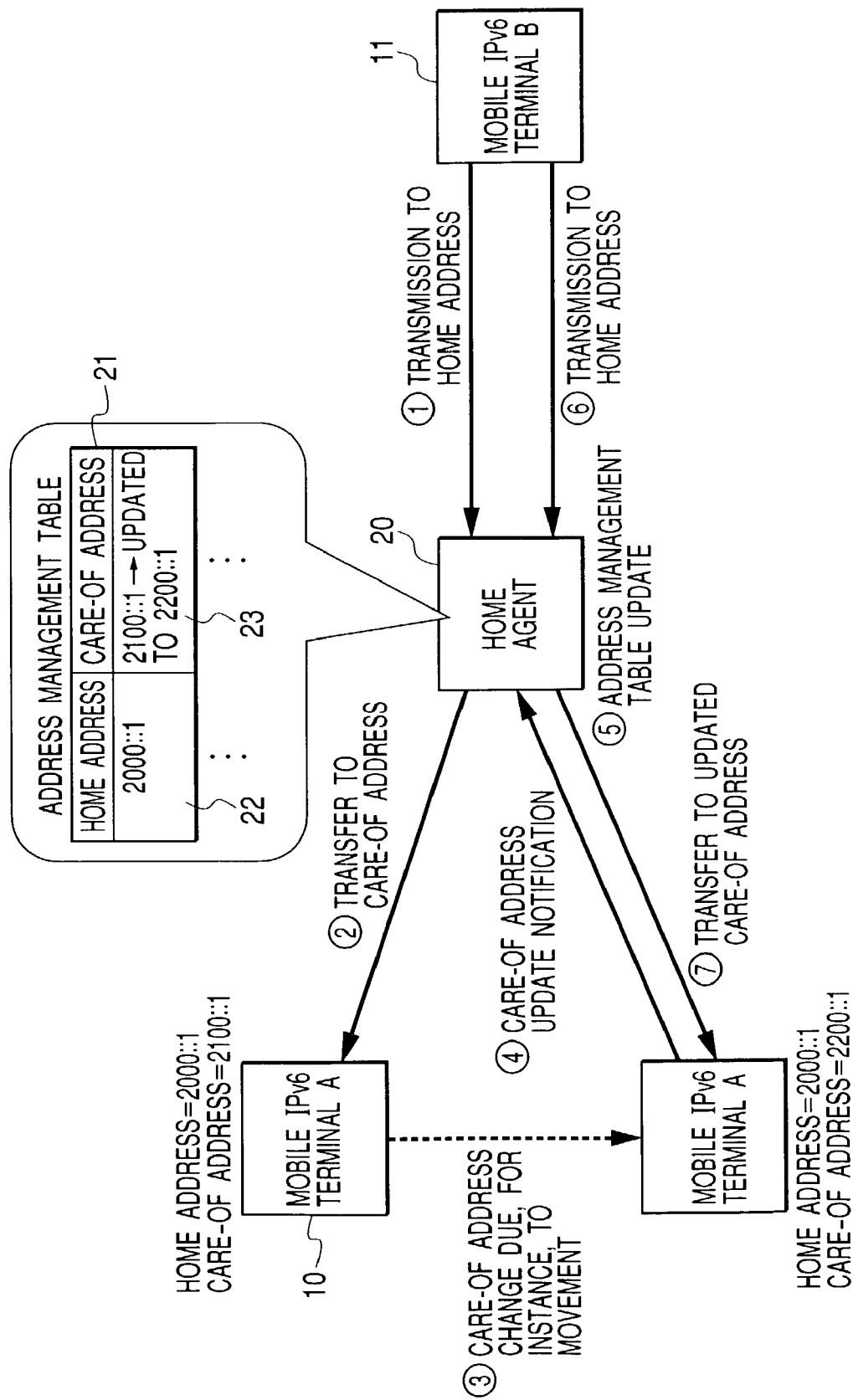
FIG. 2 illustrates Mobile IPv6 communication.
Figure 3:
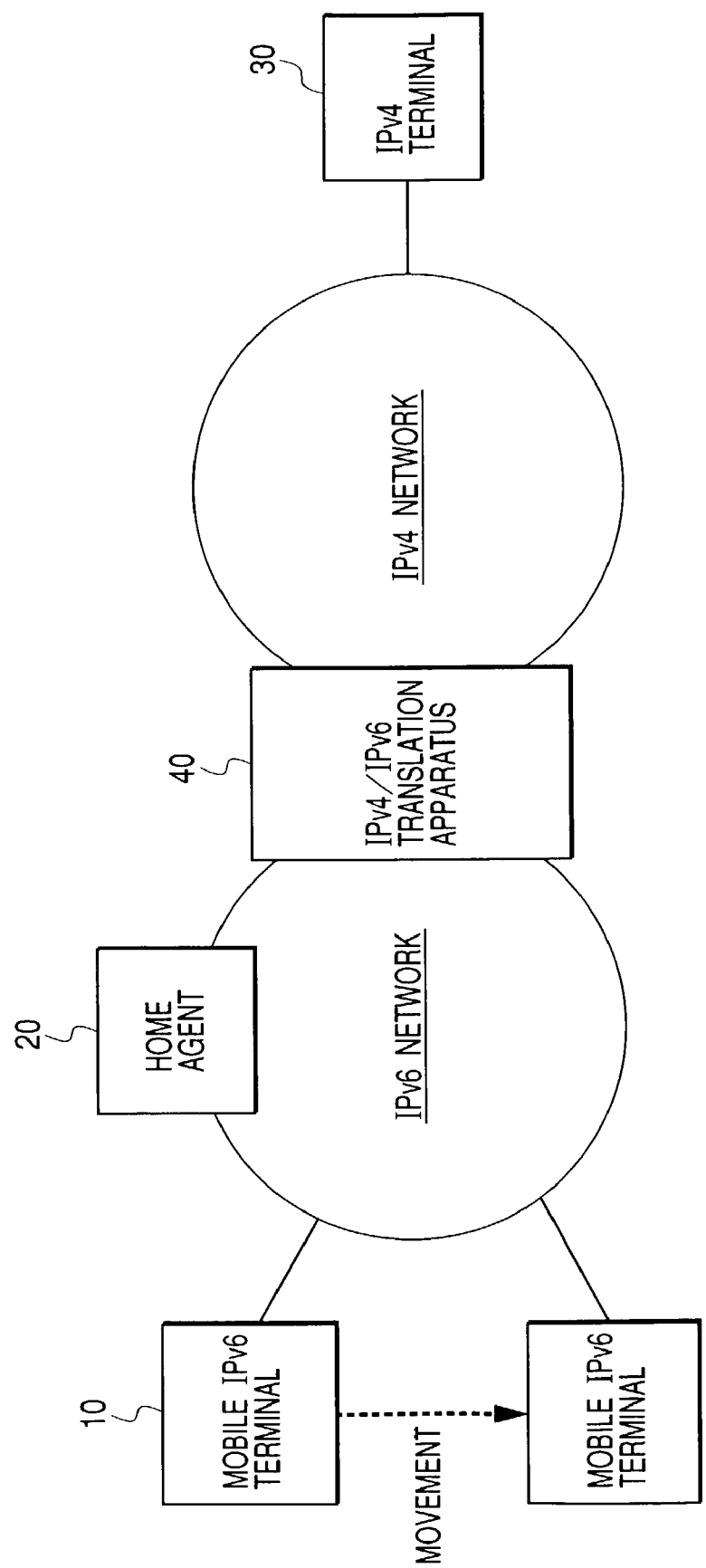
FIG. 3 illustrates a network configuration that contains the IPv4/IPv6 translation apparatus.
Figure 4:
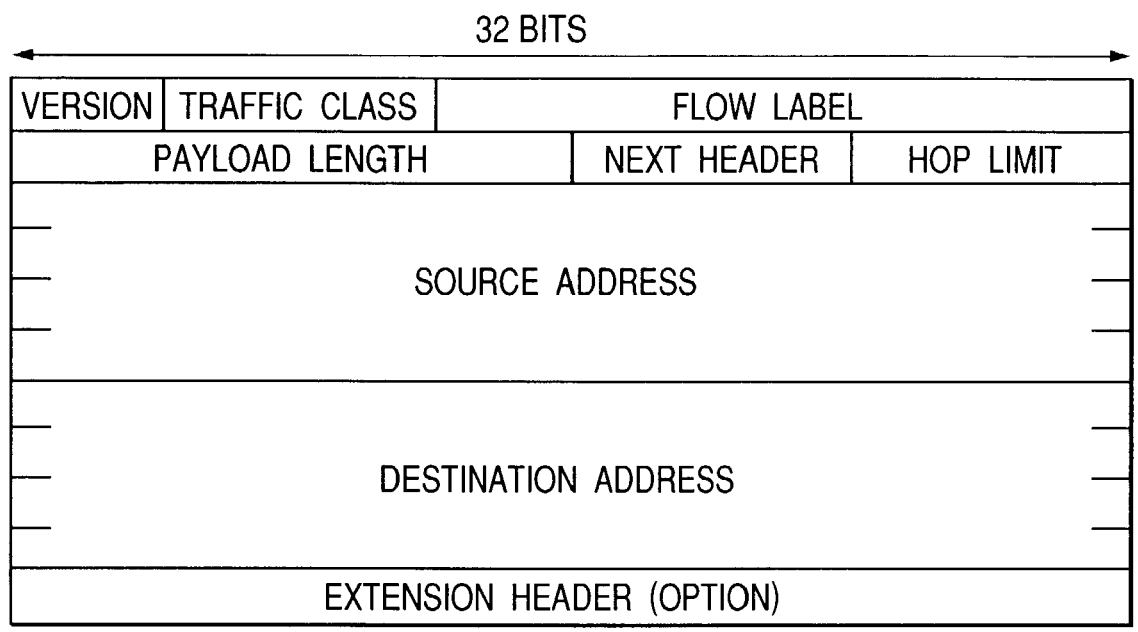
FIG. 4 illustrates the IPv6 header format.
Figure 5:
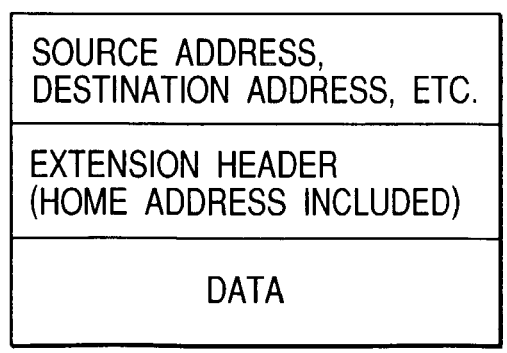
FIG. 5 illustrates the Mobile IPv6 packet structure.
Figure 6:
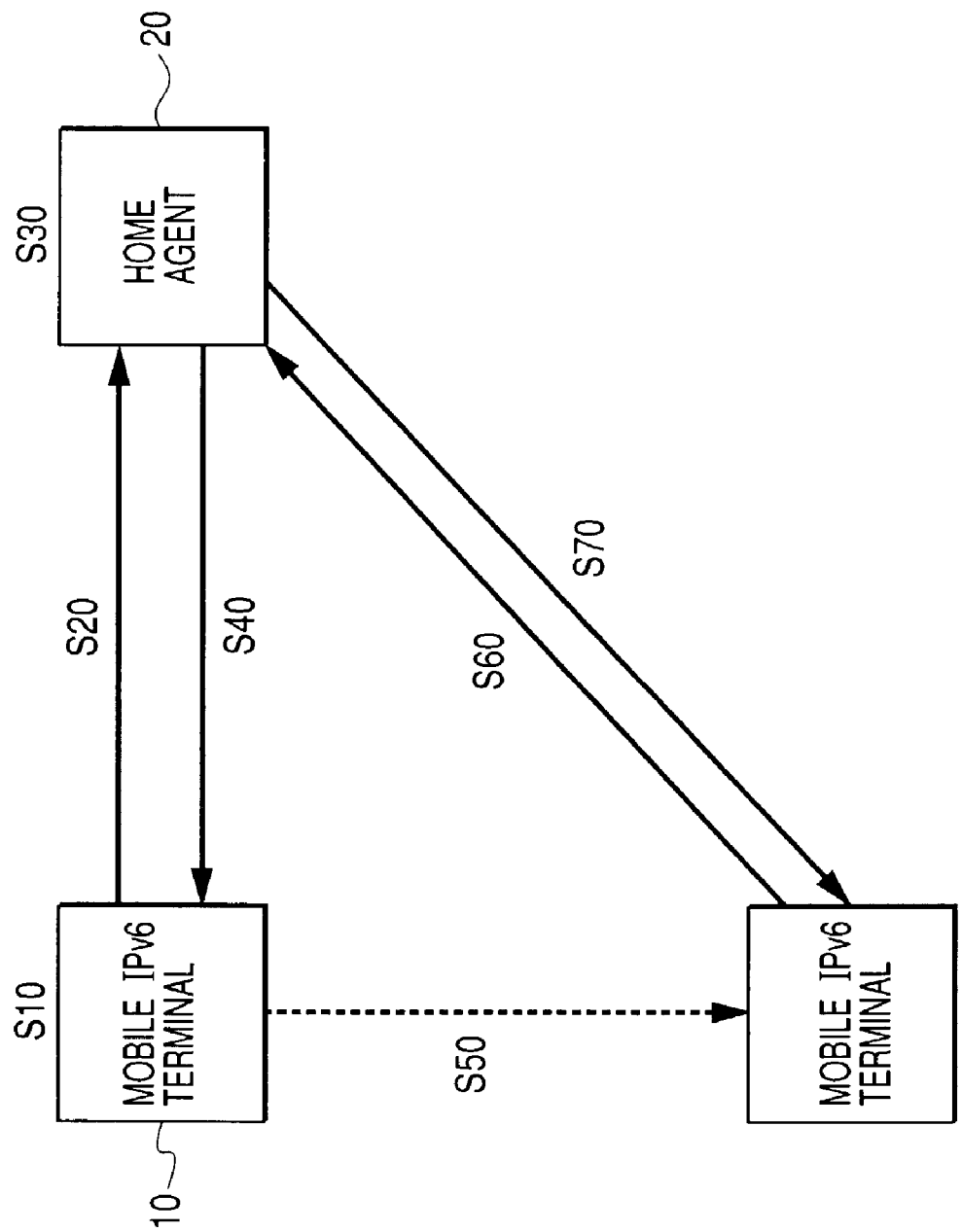
FIG. 6 shows how a Mobile IPv6 terminal notifies the home agent of an address.
Figure 7:
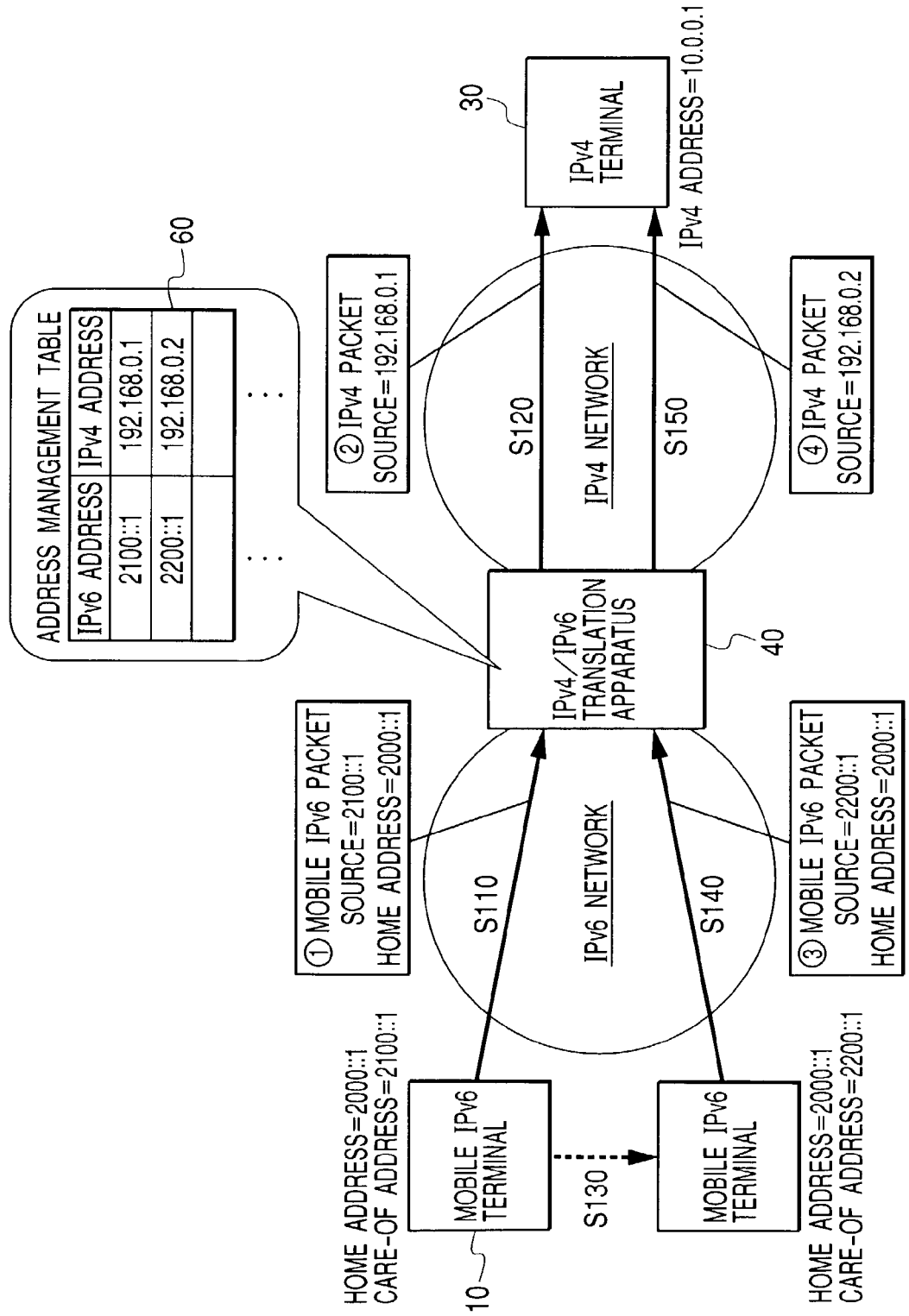
FIG. 7 illustrates a packet translation process performed by a conventional IPv6/IPv4 translator.
Figure 8:
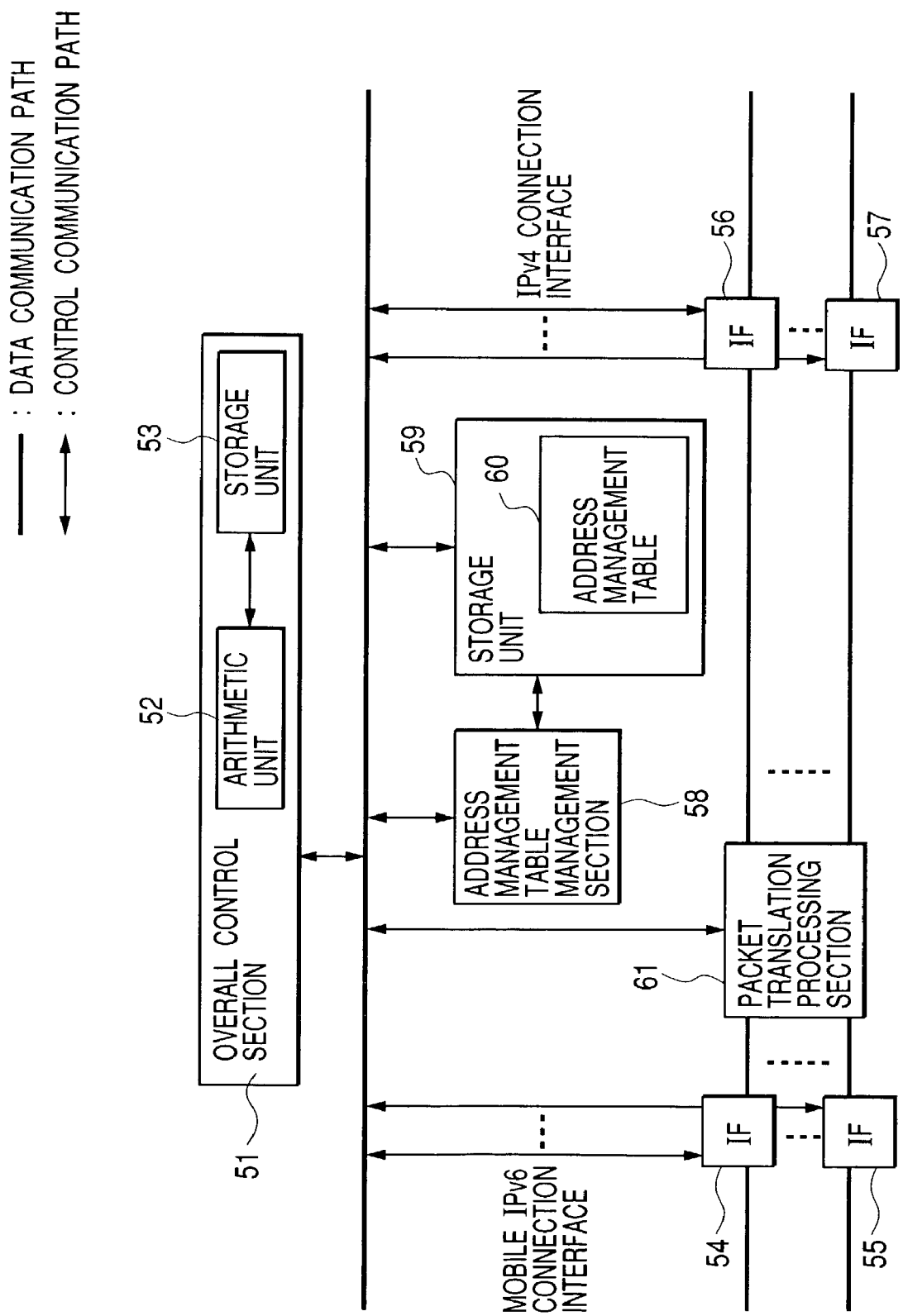
FIG. 8 shows the structure of the apparatus of the present invention.

FIG. 3 and FIGS. 8 to 12 illustrate the structure of a protocol translation apparatus according to a first embodiment of the present invention. Specifically, the protocol translation apparatus is an IPv4/IPv6 translation apparatus 40 having a protocol translation function as shown in FIG. 3. As indicated in FIG. 3, the network connections among a home agent 20, Mobile IPv6 terminal (first terminal) 10, IPv4 terminal (second terminal) 30, and IPv4/IPv6 translation apparatus (protocol translation apparatus) 40 are the same as stated in the description of the problem to be solved by the present invention. The block diagram in FIG. 8 shows a typical internal structure of the IPv4/IPv6 translation apparatus, which is a protocol translation apparatus. As shown in this figure, the IPv4/IPv6 translation apparatus consists of an overall control section 51, one or more interfaces 54, 55 for connecting a Mobile IPv6 terminal 10 to a network, one or more interfaces 56, 57 for connecting to an IPv4 terminal 30, a storage unit (means of storage for address management) for storing an address management table 60, and a packet translation processing section 61. The overall control section 51 consists of an arithmetic unit 52 and a storage unit 53, which are interconnected via a control communication path. As shown in FIG. 8, said sections 51 to 61 are interconnected as needed via control communication paths and data communication paths. A typical structure of the address management table 60 is as indicated in FIG. 1.

The subsequent description deals with a communication process that is performed between the Mobile IPv6 terminal 10 and IPv4 terminal 30, which are interconnected via said IPv4/IPv6 translation apparatus 40. The communication functions of the home agent 20, Mobile IPv6 terminal 10, and IPv4 terminal 30 are as described under BACKGROUND OF THE INVENTION. The home agent 20 announces the route information about the home address of the Mobile IPv6 terminal 10 to the network.

Figure 9:
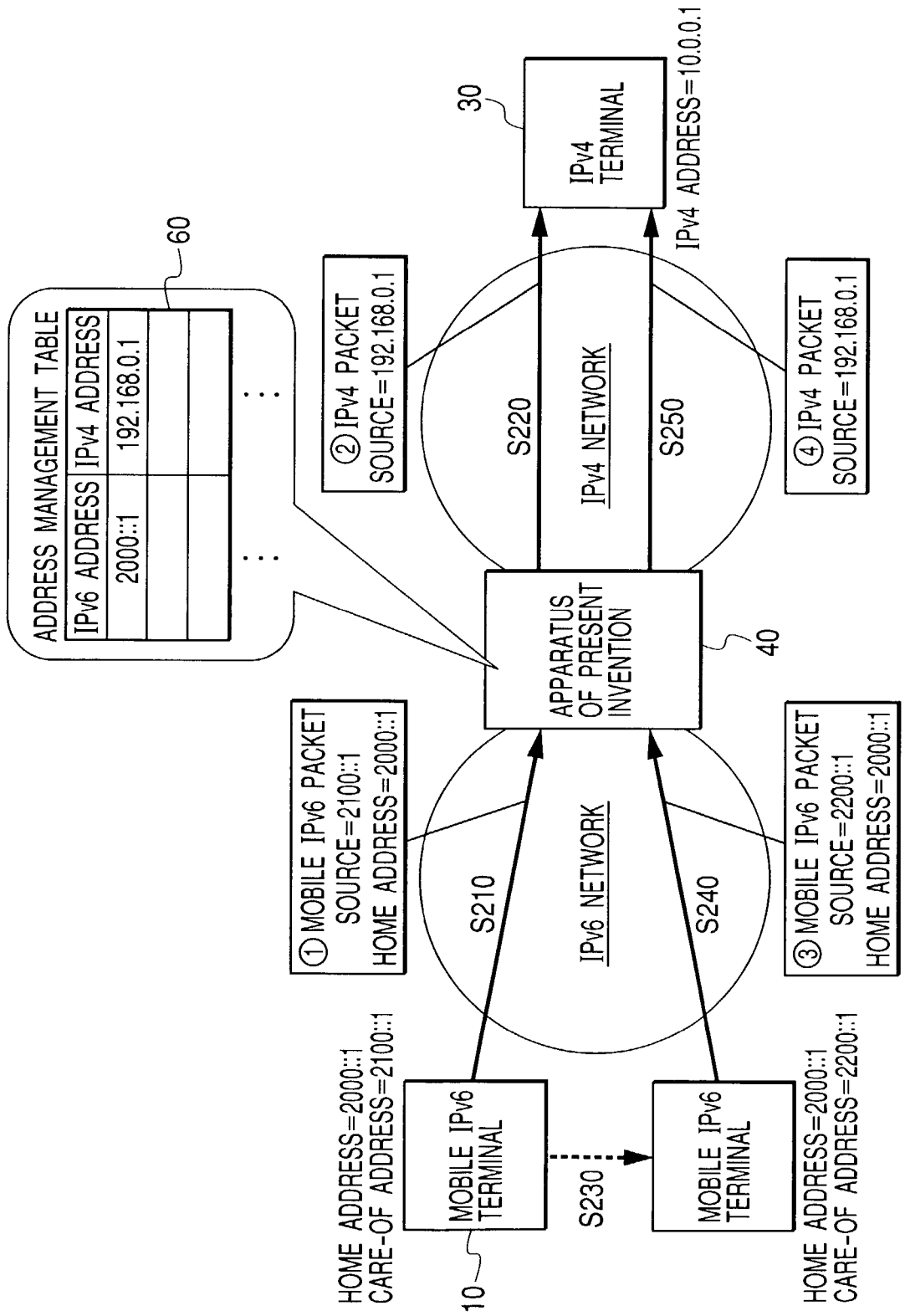
FIG. 9 illustrates a packet translation process (for a packet transmission from a Mobile IPv6 terminal to an IPv4 terminal) of a first Exemplary Embodiment.

Referring first to FIG. 9, a packet transmission from a Mobile IPv6 terminal 10 to an IPv4 terminal 30 is shown. As indicated in this figure, the Mobile IPv6 terminal 10 has the care-of address value 2100::1 and the home address value 2000::1. On the other hand, the IPv4 terminal 30 has the address value 10.0.0.1. Before a move, the Mobile IPv6 terminal 10 transmits a packet to the IPv6 network with its care-of address value (2100::1) specified as the packet transmission source address and its home address value (2000::1) stored in the packet's IPv6 extension header (S210).

The IPv4/IPv6 translation apparatus 40 receives the packet from the IPv6 network, translates the source address into a virtual IPv4 address corresponding to the home address in the packet's extension header in accordance with the address management table, and sends the packet to the IPv4 network (S220). The IPv4 terminal recognizes the source address value as 192.168.0.1. If the Mobile IPv6 terminal 10 moves to another network during the packet communication so that its care-of address value changes to 2200::1 (S230), the Mobile IPv6 terminal 10 sends a packet to the IPv4 terminal 30 with the new care-of address used as the source address. The IPv6 extension header in this packet stores the home address value (2000::1) of the Mobile IPv6 terminal 10 (S240). The IPv4/IPv6 translation apparatus 40 receives the packet from the IPv6 network, translates the source address into a virtual IPv4 address corresponding to the home address stored in the packet's extension header in accordance with the address management table, and sends the packet to the IPv4 network (S250). The IPv4 terminal 30 recognizes the source address value as 192.168.0.1. Even if the care-of address is changed due to a move of the Mobile IPv6 terminal 10, the source address contained in the IPv4 packet received by the IPv4 terminal 30 remains unchanged.

Consequently, even when the care-of address is changed due to a move of the Mobile IPv6 terminal 10, the IPv4 terminal 30 can recognize its received packet as the transmission from the same source and continue with the packet communication.

Figure 10:
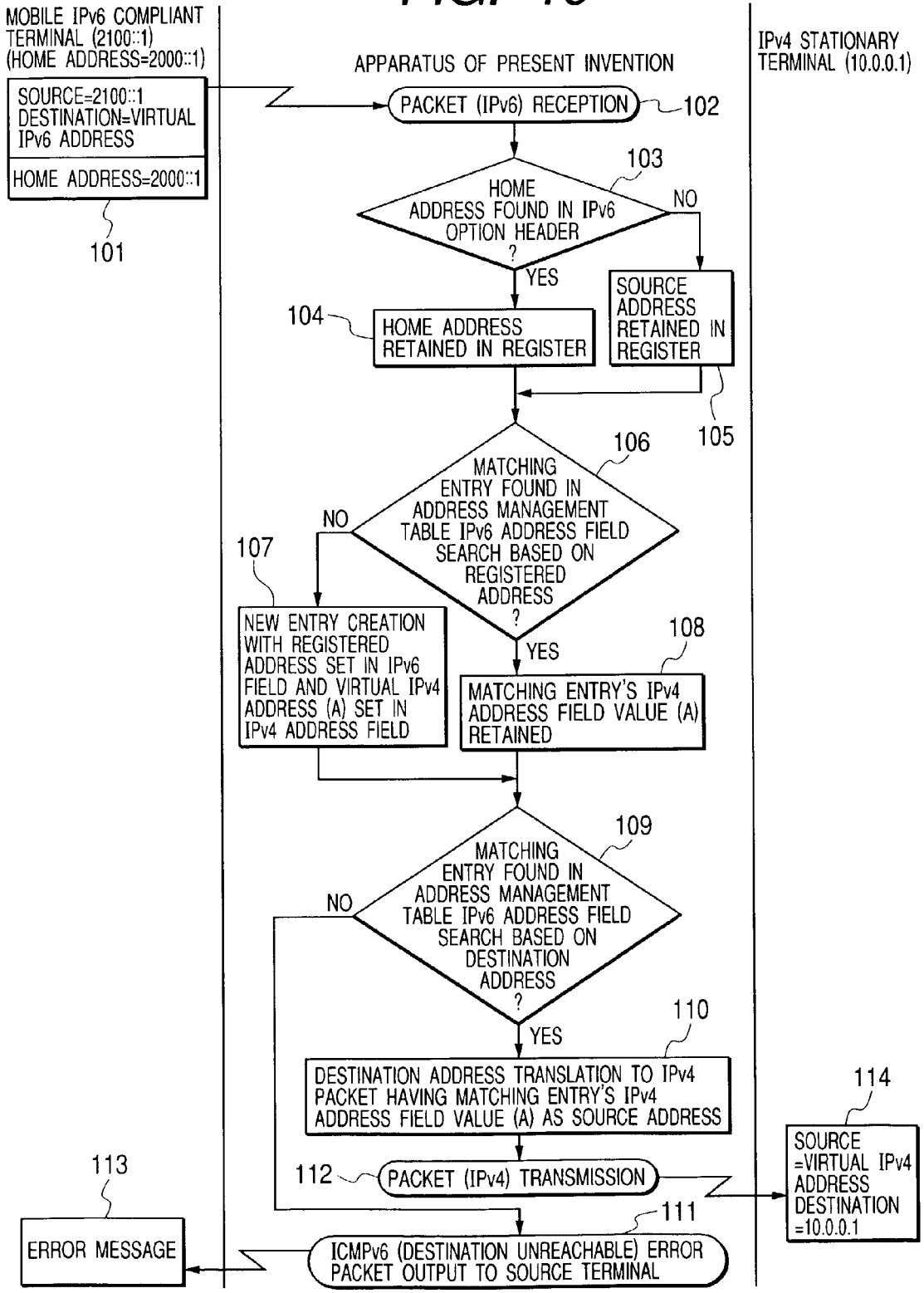
FIG. 10 is a typical flow chart of a packet translation process (for a packet transmission from a Mobile IPv6 terminal to an IPv4 terminal) of the first Exemplary Embodiment.

FIG. 10 shows a process flow chart of the IPv4/IPv6 translation apparatus 40. The flow chart in FIG. 10 is explained below with reference to an example shown in FIG. 9.

Upon receipt of an IPv6 packet (101) from a Mobile IPv6 terminal 10, the IPv4/IPv6 translation apparatus 40 checks whether the IPv6 option header contains the information about a home address (102→103). If the home address information is not found (103: NO), the IPv4/IPv6 translation apparatus uses a source address to search the address management table (105→106). If the home address information is found in the received packet (103: YES), on the other hand, the IPv4/IPv6 translation apparatus 40 searches the address management table for a record having the same home address as found in the packet's extension header (104→106). These search operations are conducted by referencing the address management table 60 in the storage unit 59 under the control of the overall control section 51.

When a matching record is found as a result of an address management table search (106: YES "Matching entry found"), the IPv4/IPv6 translation apparatus retains the IPv4 address value that is contained in the matching record (108).

If no matching record is found (106: NO), on the other hand, the IPv4/IPv6 translation apparatus adds a new record to an address management field with a new virtual IPv4 address assigned and retains this IPv4 address (107). This addition operation is conducted by updating the address management table 60 in the storage unit 59 via the address management table management section and under the control of the overall control section 51.

Next, the IPv4/IPv6 translation apparatus 40 searches the address management table for the destination address. If a matching record is found (109: YES "Matching entry found"), the IPv4/IPv6 translation apparatus translates the packet into an IPv4 packet that carries the IPv4 address found in the matching record as the destination address and the IPv4 address retained in step 107 or 108 as the source address (110), and transmits the resulting packet to an IPv4 terminal 30 (112). The IPv4 terminal 30 receives this transmitted packet (114). If the employed format is such that an IPv4 address is embedded in a destination IPv6 address, a corresponding (matching) IPv4 address can be determined without searching the address management table in step 109.

If no matching record is found (109: NO), on the other hand, the IPv4/IPv6 translation apparatus 40 returns an ICMPv6 (Internet Control Messaging Protocol for the Internet Protocol Version 6) error (Destination Unreachable) to the packet transmission source terminal (111). The ICMPv6 error is publicly disclosed by RFC 2463 (Pages 6 and 7). A Mobile IPv6 terminal 10 receives the packet in ICMPv6 error (113).

The IPv4 terminal 30 uses its storage unit to retain an address stored in the header of a received packet. In other words, the IPv4 terminal 30 retains a source address as an IPv4 address that correlates to the home address of the Mobile IPv6 terminal 10. Even if the Mobile IPv6 terminal 10 moves to another network during its packet communication, causing a change in the care-of address that is used as the packet's source address, the IPv4/IPv6 translation apparatus 40 translates the packet's source address into an IPv4 address that correlates to the home address. Therefore, the source address contained in the IPv4 packet received by the IPv4 terminal 30 remains unchanged. As a result, the IPv4 terminal 30 suffers on packet loss as it can recognize its received packet as the transmission from the same source and continue with the packet communication without an interruption.

Figure 11:
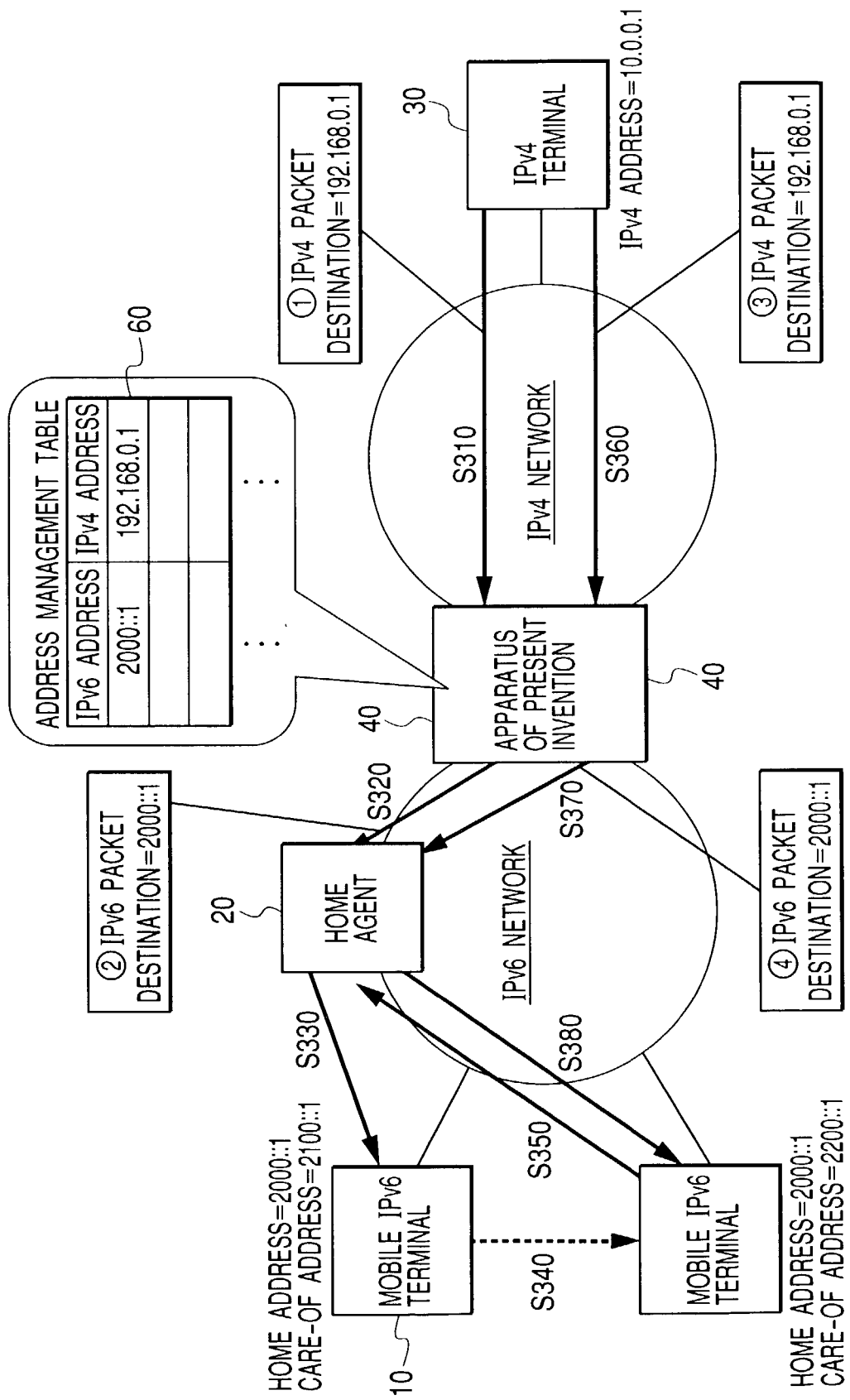
FIG. 11 illustrates a packet translation process (for a packet transmission from an IPv6 terminal to a Mobile IPv6 terminal) of the first Exemplary Embodiment.

A packet transmission from an IPv4 terminal 30 to a Mobile IPv6 terminal 10 is discussed below with reference to FIG. 11. As shown in this figure, the Mobile IPv6 terminal 10 has the care-of address value 2100::1 and the home address value 2000::1. The IPv4 terminal 30 has the address value 10.0.0.1. The figure presumes that the IPV4 terminal 30 has used a DNS to work out a solution for the home address of the Mobile IPv6 terminal 10 to communicate with, which is the IPv6 address, and that the IPv4/IPv6 translation apparatus 40 has notified the IPv4 terminal 30 of an IPv4 address correlating to the address of the Mobile IPv6 terminal 10 and recorded such a correlation in the address management table.

When the IPv4 terminal 30 intends to transmit a packet, it sends the packet to the IPv4 network with its own address value (10.0.0.1) specified as the packet's source address and a virtual IPv4 address correlating to the home address value (2000::1) of the Mobile IPv6 terminal 10 at the destination specified as the destination address (S310).

The IPv4/IPv6 translation apparatus 40 receives the packet from the IPv4 network, translates the destination address into the home address of the remote Mobile IPv6 terminal 10 in accordance with the address management table, and sends the packet to the IPv6 network (S320).

The home agent 20 receives the packet, which is destined for the home address, and transfers the received packet to the Mobile IPv6 terminal's care-of address correlating to the home address. Communication is effected in this manner (S330).

If the Mobile IPv6 terminal 10 moves to another network during the packet communication, letting its care-of address change to the value 2200::1 (S340), it registers its new care-of address in the home agent 20 (S350). Even after the move of the Mobile IPv6 terminal 10, the IPv4 terminal 30 continues to send the packet to a virtual IPv4 address correlating to the home address value of the Mobile IPv6 terminal 10 at the destination (S360).

The IPv4/IPv6 translation apparatus 40 receives the packet from the IPv4 network, translates the source address into the home address of the remote Mobile IPv6 terminal 10, and sends the packet to the IPv6 network (S370).

The home agent 20 receives the packet, which is destined for the home address, and transfers the received packet to the Mobile IPv6 terminal's care-of address correlating to the home address. Communication is effected in this manner (S380).

As a result, the packet communication can be continuously effected as the packet transmitted by the IPv4 terminal 30 can reach the Mobile IPv6 terminal 10 even if the Mobile IPv6 terminal 10 moves, causing a change in its care-of address.

Figure 12:
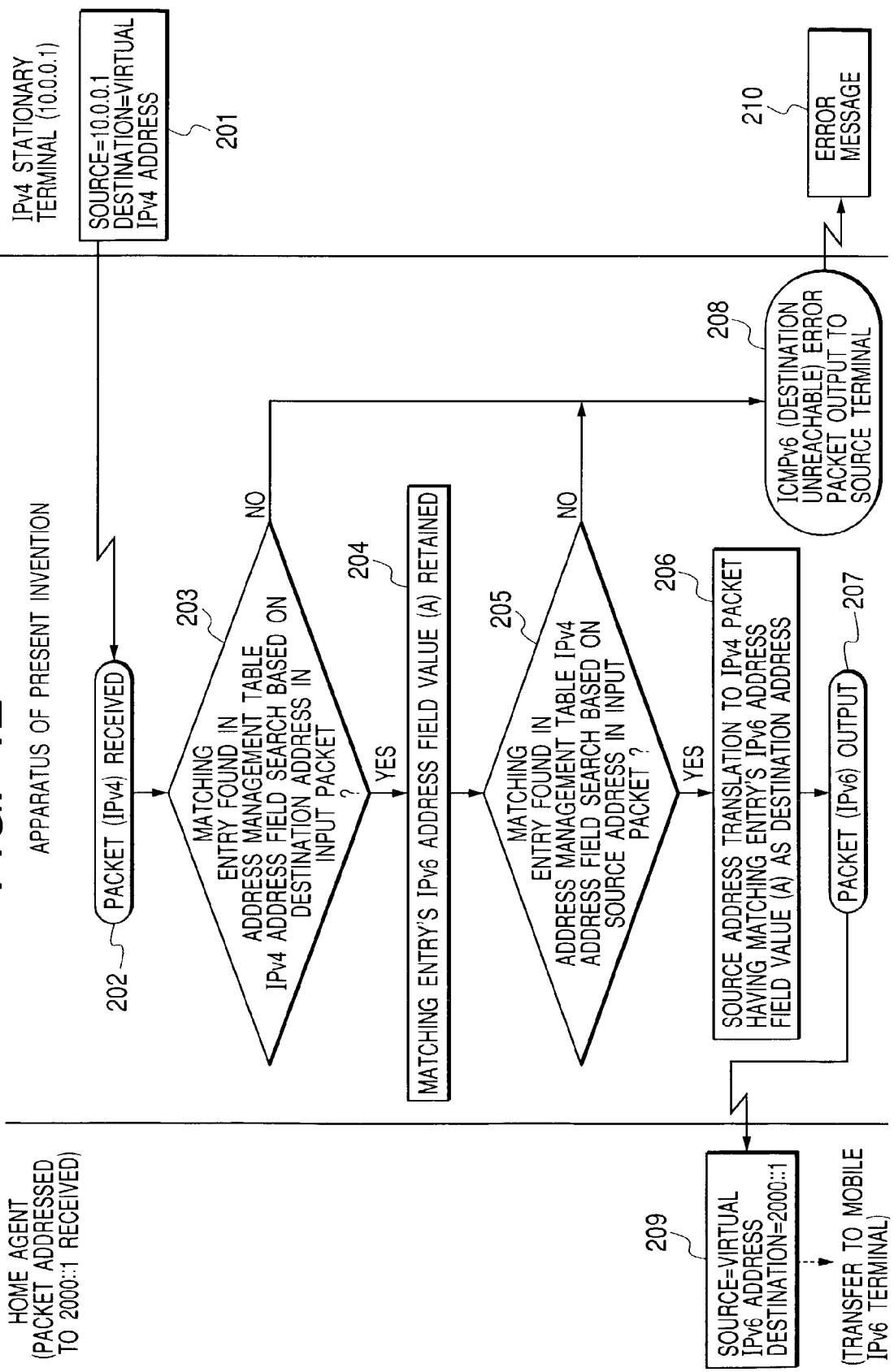
FIG. 12 is a typical flow chart of a packet translation process (for a packet transmission from an IPv4 terminal to a Mobile IPv6 terminal) of the first Exemplary Embodiment.

FIG. 12 shows a process flow chart of the IPv4/IPv6 translation apparatus 40. The flow chart in FIG. 12 is explained below with reference to an example shown in FIG.

Upon receipt of an IPv4 packet (201) from an IPv4 terminal 30, the IPv4/IPv6 translation apparatus 40 searches the address management table for a record having the same IPv4 address as the packet's destination address (202→203). This search operation is conducted by referencing the address management table 60 in the storage unit 59 under the control of the overall control section 51.

If a matching record is found as a result of the search (203: YES "Matching entry found"), the IPv4/IPv6 translation apparatus retains the IPv6 address value contained in the matching record (204).

Next, the IPv4/IPv6 translation apparatus 40 searches the address management table for a record having the same IPv4 address as the source address. When a matching record is found (205: YES "Matching entry found"), the IPv4/IPv6 translation apparatus translates the packet to an IPv6 packet having an IPv6 address found in the matching record as the source address and an IPv6 address retained in step 204 as the destination address (206), and then transmits the resulting packet to the Mobile IPv6 terminal 10 (207). This search operation is conducted by referencing the address management table 60 in the storage unit 59 under the control of the overall control section 51. The Mobile IPv6 terminal 10 receives the transmitted packet (209). If the employed format is such that the source's IPv4 address is embedded in an IPv6 address, a corresponding (matching) IPv6 address can be determined without searching the address management table in step 205.

If no matching record is found (203: NO or 205: NO), on the other hand, the IPv4/IPv6 translation apparatus 40 returns an ICMP (Internet Control Messaging Protocol) error (Destination Unreachable) to the packet transmission source terminal (208). The ICMP error is publicly disclosed by RFC 792 (Pages 4 and 5). The IPv4 terminal 30 receives the packet in ICMP error (210).

That is, when the IPv4 terminal 30 sends a transmission to the Mobile IPv6 terminal 10, it transmits a packet that is destined for a virtual IPv4 address correlating to the home address no matter whether the Mobile IPv6 terminal 10 moves. When the Mobile IPv6 terminal responds to the IPv4 terminal 30, the IPv4/IPv6 translation apparatus 40 references the address management table and translates the source address into a virtual IPv4 address correlating to the home address even if the care-of address changes due to a terminal move. Therefore, communication can be maintained as the IPv4 terminal 30 can recognize that a response packet is transmitted from the destination terminal.

(2) Second Exemplary Embodiment

A second Exemplary Embodiment of the present invention is explained below with reference to FIGS. 13 to 16. In the second Exemplary Embodiment, an IPv6 field is added to the structure of the address management table in the IPv4/IPv6 translation apparatus 40 and used as the care-of address field. Except for this field addition, the address management table structure is the same as that described in the first Exemplary Embodiment.

Figure 13:
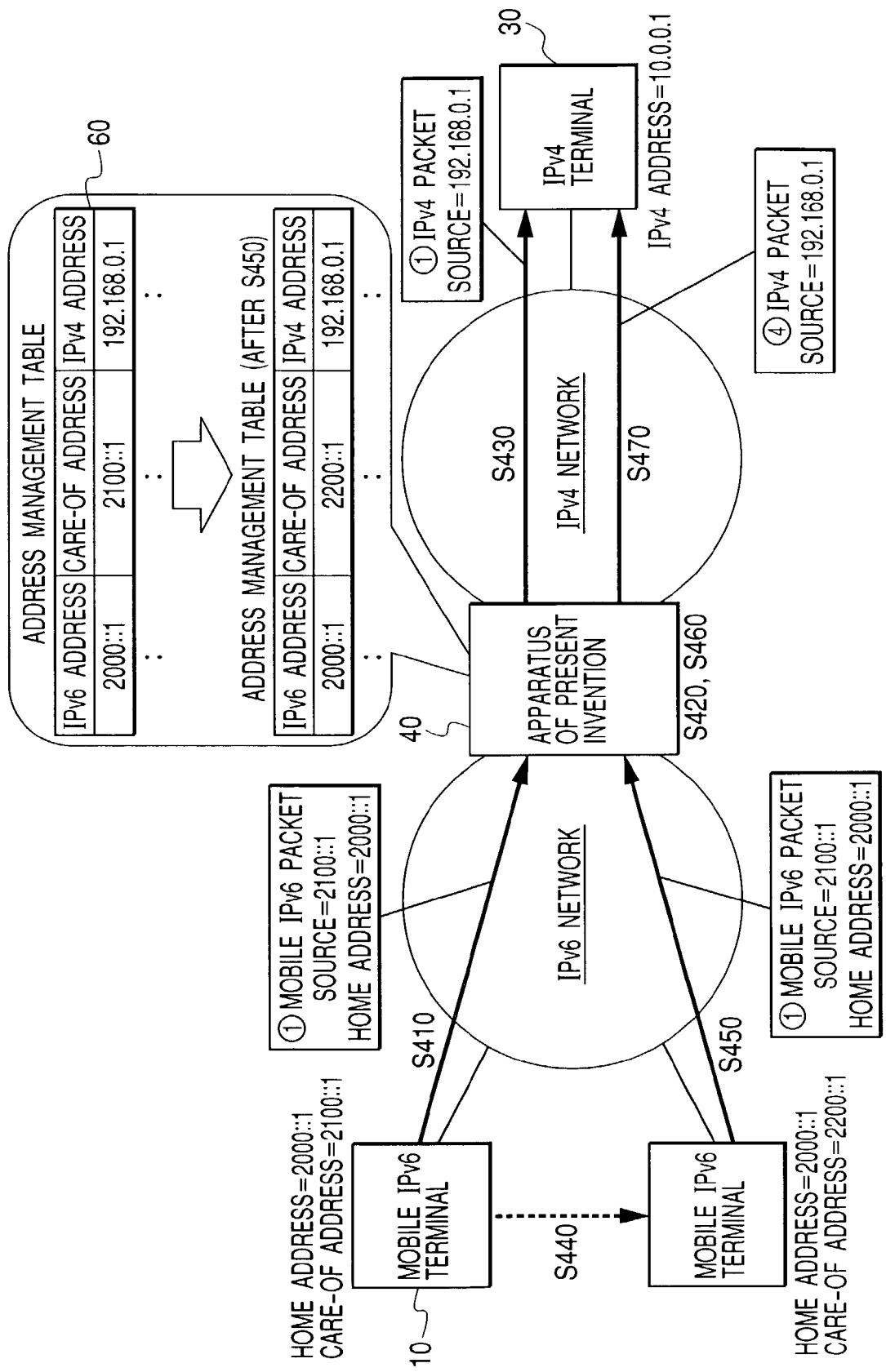
FIG. 13 illustrates a packet translation process (for a packet transmission from a Mobile IPv6 terminal to an IPv4 terminal) of a second Exemplary Embodiment.

First of all, a packet transmission from a Mobile IPv6 terminal 10 to an IPv4 terminal 30 is discussed below with reference to FIG. 13.

Before a move, the Mobile IPv6 terminal 10 transmits a packet to the IPv6 network with its care-of address value (2100::1) specified as the packet transmission source address and its home address value (2000::1) stored in the packet's IPv6 extension header (S410). Upon receipt of the Mobile IPv6 packet from the IPv6 network, the IPv4/IPv6 translation apparatus 40 searches the IPv6 field in the address management table for the home address stored in the header, and updates the care-of address field of a matching record in accordance with the source address stored in the header (S420). The IPv4/IPv6 translation apparatus 40 then translates the packet's source address into the IPv4 address field value of the matching record, and transmits the packet to the IPv4 network (S430). If the Mobile IPv6 terminal 10 moves to another network during the packet communication, changing the care-of address value to 2200::1 (S440), it transmits the packet carrying the resulting new care-of address as the source address to the IPv4 terminal 30 (S450). The IPv6 extension header of this packet stores the home address value (2000::1) of the Mobile IPv6 terminal 10. The IPv4/IPv6 translation apparatus 40 receives the packet from the IPv6 network, updates the care-of address in the address management table (S460), translates the source address into a virtual IPv4 address correlating to the home address in the packet's extension header, and transmits the packet to the IPv4 network (S470). Therefore, the source address in the packet received by the IPv4 terminal 30 remains unchanged even if the Mobile IPv6 terminal 10 moves, causing a change in the care-of address. Further, the IPv4/IPv6 translation apparatus 40 can memorize the correlation between the home address and care-of address of the Mobile IPv6 terminal 10.

Figure 14:
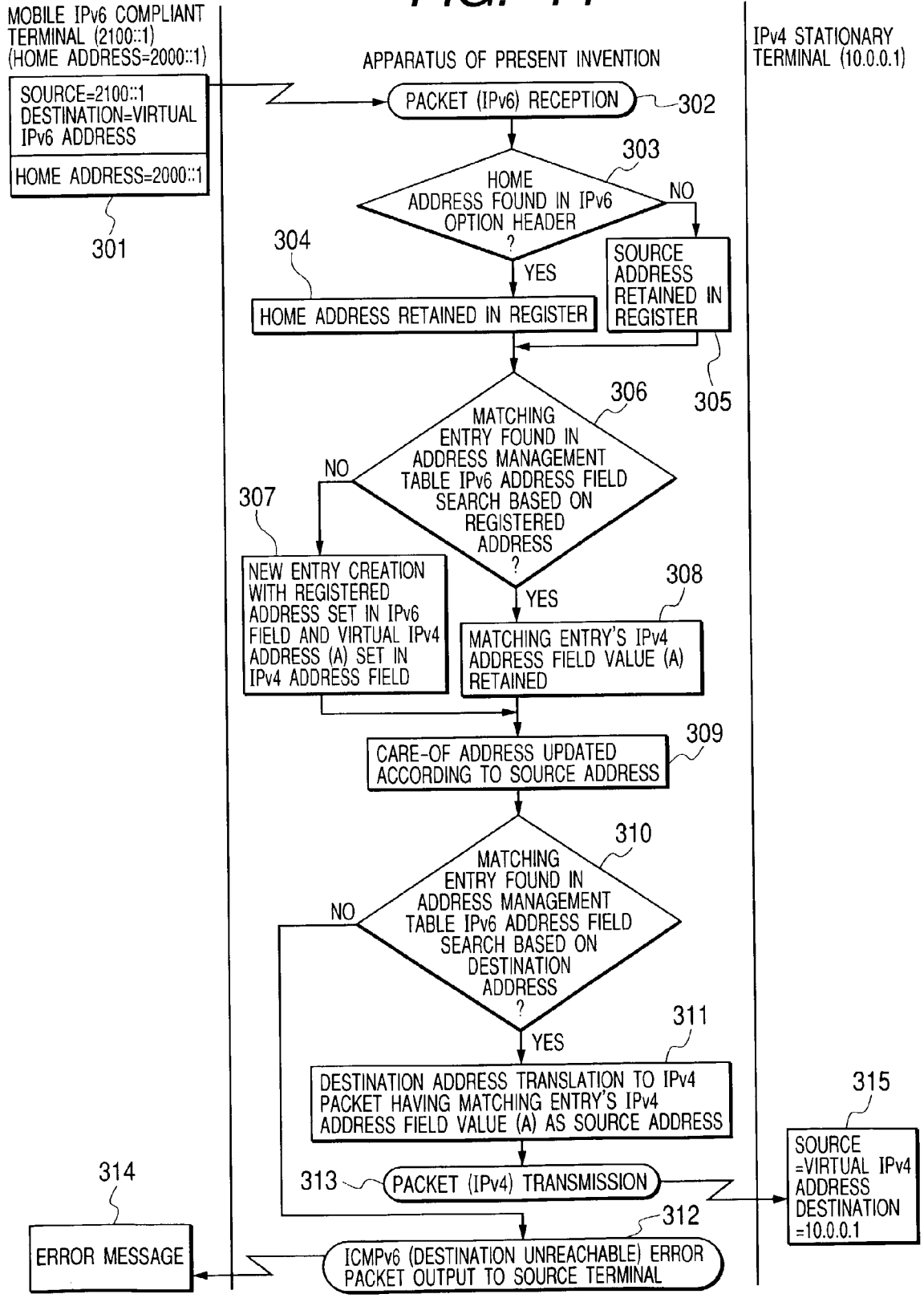
FIG. 14 is a typical flow chart of a packet translation process (for a packet transmission from a Mobile IPv6 terminal to an IPv4 terminal) of the second Exemplary Embodiment.

FIG. 14 shows a process flow chart of the IPv4/IPv6 translation apparatus 40. The flow chart in FIG. 1 is explained below with reference to an example shown in FIG. 13.

Upon receipt of an IPv6 packet (301) from a Mobile IPv6 terminal 10, the IPv4/IPv6 translation apparatus 40 checks whether the IPv6 option header contains the information about a home address (302→303). If the home address information is not found (303: NO), the IPv4/IPv6 translation apparatus uses a source address to search the address management table (305→106). If the home address information is found in the received packet (303: YES), on the other hand, the IPv4/IPv6 translation apparatus 40 searches the address management table shown in FIG. 13 for a record having the same home address as found in the packet's extension header (304→306). These search operations are conducted by referencing the address management table 60 in the storage unit 59 under the control of the overall control section 51.

When a matching record is found as a result of an address management table search (106: YES "Matching entry found"), the IPv4/IPv6 translation apparatus retains the IPv4 address value that is contained in the matching record (308).

If no matching record is found (306: NO), on the other hand, the IPv4/IPv6 translation apparatus adds a new record to an address management field with a new virtual IPv4 address assigned, regards the added record as a matching one, and retains this IPv4 address (307). This addition operation is conducted by updating the address management table 60 in the storage unit 59 via the address management table management section and under the control of the overall control section 51.

Next, the IPv4/IPv6 translation apparatus 40 updates the care-of address field of the matching record in accordance with the destination address value.

Further, the IPv4/IPv6 translation apparatus 40 searches the address management table for the destination address. If a matching record is found (310: YES "Matching entry found"), the IPv4/IPv6 translation apparatus translates the packet into an IPv4 packet that carries the IPv4 address found in the matching record as the destination address and the IPv4 address retained in step 307 or 308 as the source address (311), and transmits the resulting packet to the IPv4 terminal 30 (313). The IPv4 terminal 30 receives this transmitted packet (315). If the employed format is such that an IPv4 address is embedded in a destination IPv6 address, a corresponding (matching) IPv4 address can be determined without searching the address management table in step 310.

If no matching record is found (310: NO), on the other hand, the IPv4/IPv6 translation apparatus 40 returns an ICMPv6 error (Destination Unreachable) to the packet transmission source terminal (312). The Mobile IPv6 terminal 10 receives the packet in ICMPv6 error (314).

Figure 15:
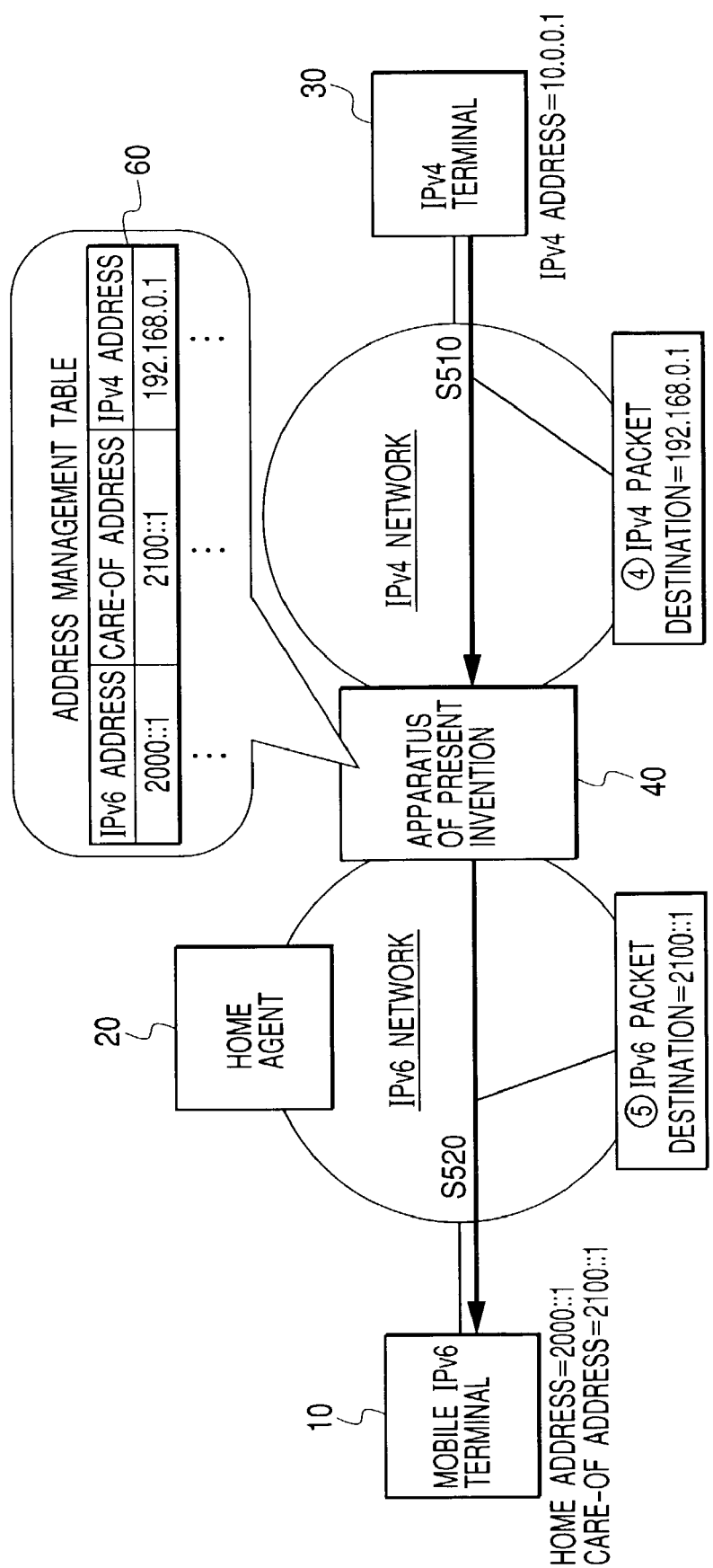
FIG. 15 illustrates a packet translation process (for a packet transmission from an IPv6 terminal to a Mobile IPv6 terminal) of the second Exemplary Embodiment.

A packet transmission from an IPv4 terminal 30 to a Mobile IPv6 terminal 10 is discussed below with reference to FIG. 15.

When the IPv4 terminal 30 intends to transmit a packet, it sends the packet to the IPv4 network with its own address value (10.0.0.1) specified as the packet's source address and a virtual IPv4 address correlating to the home address value (2000::1) of the Mobile IPv6 terminal 10 at the destination specified as the destination address (S510).

The IPv4/IPv6 translation apparatus 40 receives the packet from the IPv4 network, translates the destination address into the care-of address of the remote Mobile IPv6 terminal 10 in accordance with the address management table, and sends the packet to the IPv6 network (S520).

The packet transmitted by the IPv4/IPv6 translation apparatus 40 does not have to go through the home agent 20. It is delivered to the Mobile IPv6 terminal 10 along an ideal route.

Figure 16:
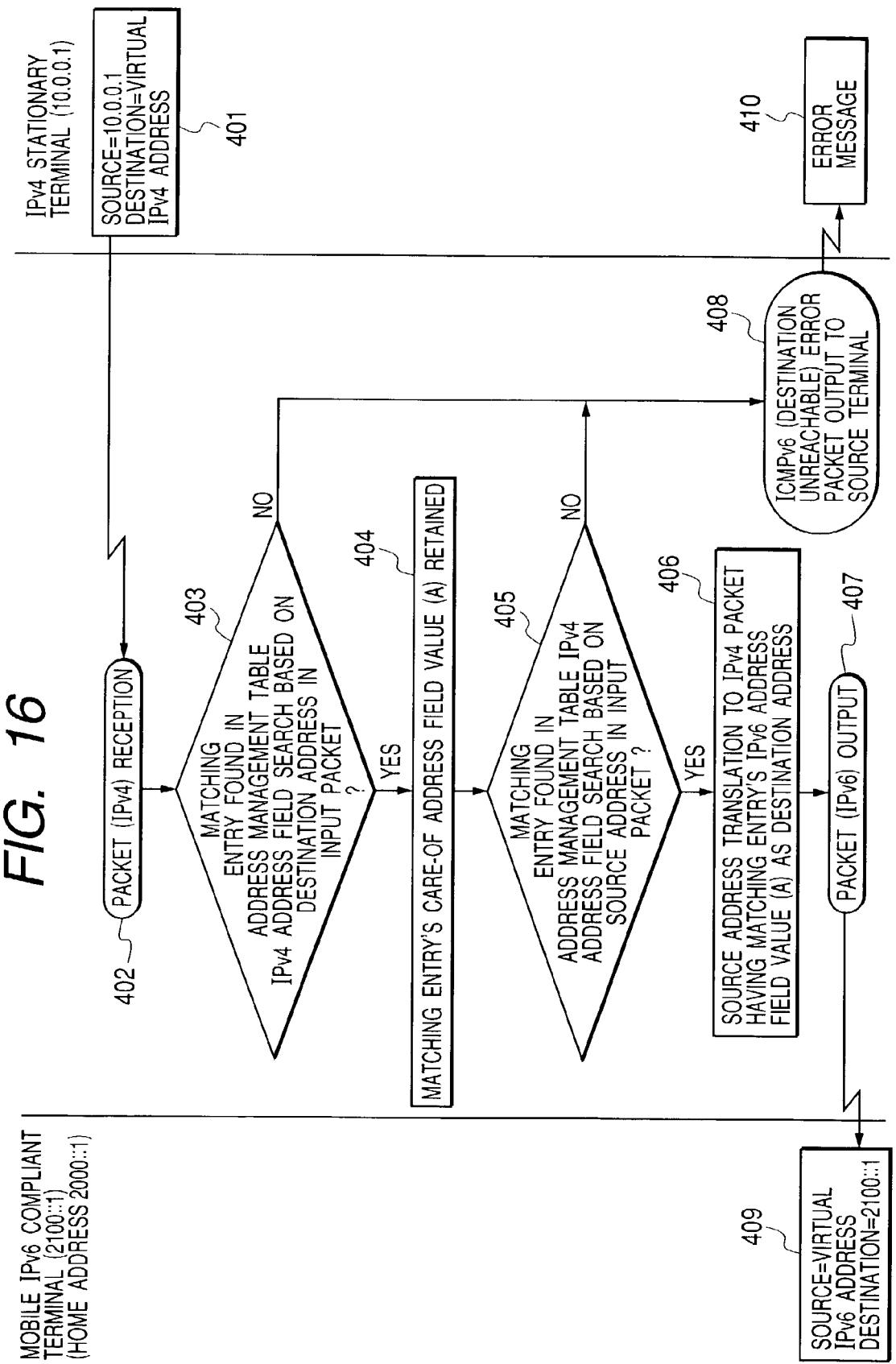
FIG. 16 is a typical flow chart of a packet translation process (for a packet transmission from an IPv4 terminal to a Mobile IPv6 terminal) of the second Exemplary Embodiment.

FIG. 16 shows a process flow chart of the IPv4/IPv6 translation apparatus 40. The flow chart in FIG. 16 is explained below with reference to an example shown in FIG. 15.

Upon receipt of an IPv4 packet (401) from an IPv4 terminal 30, the IPv4/IPv6 translation apparatus 40 searches the address management table for a record having the same IPv4 address as the packet's destination address (402→403). This search operation is conducted by referencing the address management table 60 in the storage unit 59 under the control of the overall control section 51.

If a matching record is found as a result of the search (403: YES "Matching entry found"), the IPv4/IPv6 translation apparatus retains the care-of address value contained in the matching record (404).

Next, the IPv4/IPv6 translation apparatus 40 searches the address management table for a record having the same IPv4 address as the source address. When a matching record is found (205: YES "Matching entry found"), the IPv4/IPv6 translation apparatus translates the packet to an IPv6 packet having an IPv6 address found in the matching record as the source address and an IPv6 address retained in step 204 as the destination address (406), and then transmits the resulting packet to the Mobile IPv6 terminal 10 (407). This search operation is conducted by referencing the address management table 60 in the storage unit 59 under the control of the overall control section 51. The Mobile IPv6 terminal 10 receives the transmitted packet (409). If the employed format is such that the source's IPv4 address is embedded in an IPv6 address, a corresponding (matching) IPv6 address can be determined without searching the address management table in step 405.

If no matching record is found (403: NO or 405: NO), on the other hand, the IPv4/IPv6 translation apparatus 40 returns an ICMP error (Destination Unreachable) to the packet transmission source terminal (408). The IPv4 terminal 30 receives the packet in ICMP error (410).

Therefore, the packet output by the IPv4/IPv6 translation apparatus 40 does not have to go through the home agent 20. It is delivered to the Mobile IPv6 terminal 10 along an ideal route.

The interruption of packet communications between a Mobile IPv6 terminal and IPv4 terminal can be remarkably reduced without regard to the move of the Mobile IPv6 terminal.

The foregoing invention has been described in terms of preferred embodiments. However, those skilled, in the art will recognize that many variations of such embodiments exist. Such variations are intended to be within the scope of the present invention and the appended claims.

What is claimed is:

1. A method for protocol translation in a network system where an IPv6 network connected to a Mobile IPv6 terminal is connected via a translation apparatus to an IPv4 network connected to an IPv4 terminal, the method comprising:

retaining a first correlation between a home address of said Mobile IPv6 terminal and a virtual IPv4 address assigned to the Mobile IPv6 terminal in said translation apparatus;

transmitting a packet from said Mobile Ipv6 terminal to said IPv6 network with a care-of address specified as the packet's source address and a home address specified in an extension header; and changing the packet's source address to the virtual IPv4 address corresponding to the home address of the packet from said Mobile IPv6 terminal in accordance with said first correlation in said translation apparatus, and transmitting the packet from the translation apparatus to said IPv4 network.

2. The method for protocol translation according to claim 1, the method further comprising:

when said Mobile IPv6 terminal moves and causes a change in said care-of address, transmitting the packet from said Mobile Ipv6 terminal to said IPv6 network with the resulting new care-of address specified as the packet's source address and the same home address as prevailing before the move specified in the extension header.

3. The method for protocol translation according to claim 1, the method further comprising:

retaining a second correlation between a home address of said Mobile IPv6 terminal and a care-of address of the Mobile IPv6 terminal in said translation apparatus;

transmitting a packet from said Mobile Ipv6 terminal to said IPv4 network with a virtual IPv4 address specified as the packet destination address; and translating the virtual IPv4 address into a corresponding home address in accordance with the first correlation in said translation apparatus; translating the home address into a corresponding care-of address in accordance with the second correlation in said translation apparatus; changing the packet transmission destination address to the resulting care-of address in said translation apparatus; and transmitting the packet from said translation apparatus to said IPv6 network.

4. The method for protocol, translation according to claim 1, wherein said virtual IPv4 address contained in the IPv4 packet that may be received by the IPv4 terminal remains unchanged, even if the care-of address is changed due to a move of the Mobile IPv6 terminal.

5. The method for protocol translation according to claim 1, wherein said first correlation is retained in an address management table that is stored in a storage unit.

6. The method for protocol translation according to claim 5, wherein when the IPv6 packet from the Mobile IPv6 terminal is received, said address management table is referred to check whether the same home address is found in said address management table, and if no matching record is found in said address management table, a new virtual IPv4 address is assigned and a new record of the correlation between the home address of said Mobile IPv6 terminal and the new virtual IPv4 address is retained in said address management table.

7. A method for protocol translation in a network system where an IPv6 network connected to a Mobile IPv6 terminal is connected via a translation apparatus to an IPv4 network connected to an IPv4 terminal, the method comprising:

retaining a first correlation between a home address of said Mobile IPv6 terminal and a virtual IPv4 address assigned to the Mobile IPv6 terminal in said translation apparatus;

transmitting a packet from said Mobile Ipv6 terminal to said IPv6 network with a care-of address specified as the packet's source address and a home address specified in an extension header; and changing the packet's source address to the virtual IPv4 address corresponding to the home address of the packet from said Mobile Ipv6 terminal in accordance with said first correlation in said translation apparatus, and transmitting the packet from the translation apparatus to said IPv4 network, wherein said virtual IPv4 address contained in the packet that may be received by the IPv4 terminal remains unchanged, even if the care-of address is changed due to a move of the Mobile IPv6 terminal.

8. A protocol translation apparatus connectable between an IPv6 network connected to a Mobile IPv6 terminal and an IP4 network connected to an IPv4 terminal, the apparatus comprising:

a means for retaining a correlation between a home address of said Mobile IPv6 terminal and a virtual IPv4 address assigned to the Mobile IPv6 terminal; and a means for receiving a packet transmitted to said IPv6 network by said Mobile IPv6 terminal with a care-of address specified as the packet transmission source and a home address specified in the extension header and transmitting the packet to said IPv4 network with the packet's source address changed to a virtual IPv4 address that corresponds to the packet's home address in accordance with said first correlation.

9. The protocol translation apparatus according to claim 8, wherein said virtual IPv4 address contained in the packet remains unchanged, even if the care-of address is changed due to a move of the Mobile IPv6 terminal.

* * * * *